(12) United States Patent
Hofmann et al.

(10) Patent No.: US 6,338,026 B2
(45) Date of Patent: Jan. 8, 2002

(54) METHOD FOR LIMITING AN ELECTRIC CURRENT THROUGH AN ELECTRICAL COMPONENT, AND LIMITING APPARATUS

(75) Inventors: Hermann Hofmann, Nürnberg; Rüdiger Kutzner, Erlangen; Jörn Steinbrink, Hannover, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/795,100

(22) Filed: Feb. 28, 2001

Related U.S. Application Data

(63) Continuation of application No. PCT/DE99/02540, filed on Aug. 13, 1999.

(30) Foreign Application Priority Data

Aug. 31, 1998 (DE) .......................................... 198 39 623

(51) Int. Cl.⁷ .............................................. G01K 17/00
(52) U.S. Cl. .......................... 702/64; 702/132; 310/315; 361/25
(58) Field of Search ................................ 702/132, 136, 702/64; 700/287, 292, 293, 299; 703/2; 310/315; 361/24, 25

(56) References Cited

U.S. PATENT DOCUMENTS

| | | | | |
|---|---|---|---|---|
| 4,722,062 A | * | 1/1988 | Breitkopf et al. | 364/508 |
| 5,057,962 A | * | 10/1991 | Alley et al. | 361/24 |
| 5,198,744 A | | 3/1993 | Kohl et al. | |
| 5,321,308 A | | 6/1994 | Johcock | |
| 5,373,205 A | | 12/1994 | Busick et al. | |
| 5,436,784 A | * | 7/1995 | Schweitzer, III et al. | 361/25 |
| 5,600,575 A | * | 2/1997 | Anticole | 364/557 |
| 5,644,510 A | * | 7/1997 | Weir | 364/557 |
| 5,761,018 A | * | 6/1998 | Blakely | 361/23 |
| 5,838,591 A | * | 11/1998 | Yamaguchi | 364/557 |
| 6,006,168 A | * | 12/1999 | Schumann et al. | 702/132 |
| 6,076,964 A | * | 6/2000 | Wu et al. | 374/141 |
| 6,157,897 A | * | 12/2000 | Yoshikawa | 702/132 |
| 6,163,202 A | * | 12/2000 | Mao | 327/513 |
| 6,172,860 B1 | * | 1/2001 | Yoshimizu et al. | 361/25 |
| 6,198,245 B1 | * | 3/2001 | Du et al. | 318/471 |
| 6,208,100 B1 | * | 3/2001 | Griesemer et al. | 318/434 |

* cited by examiner

*Primary Examiner*—Patrick Assouad
(74) *Attorney, Agent, or Firm*—Herbert L. Lerner; Laurence A. Greenberg; Werner H. Stemer

(57) ABSTRACT

The thermal load of an electrical component is used as a basis to limit an electric current through the electrical component, in particular the rotor winding of a turbogenerator. This reliably avoids overheating of the component and at the same time achieves full exhaustion of the electric current, particularly in the case of field forcing.

19 Claims, 3 Drawing Sheets

METHOD FOR LIMITING AN ELECTRIC CURRENT THROUGH AN ELECTRICAL COMPONENT, AND LIMITING APPARATUS

CROSS-REFERENCE TO RELATED APPLICATION

This application is a continuation of copending International Application No. PCT/DE99/02540, filed Aug. 13, 1999, which designated the United States.

BACKGROUND OF THE INVENTION

Field of the Invention

The invention relates to a method for limiting an electric current through an electrical component, in particular an electrical winding, and a limiting apparatus by means of which an electric current through an electrical component can be limited.

Johncock (U.S. Pat. No. 5,321,308) is based on control of the field current through the rotor winding of a generator. The temperature of the rotor is calculated with the aid of the field current and the electrical resistance of the rotor winding. In this case, a known resistance/temperature relationship for copper is used as the basis. The field current is reduced if the rotor overheats.

Kohl, et al. (U.S. Pat. No. 5,198,744) describes a generator, in particular a starter for a motor vehicle. A field current through a field winding of the generator is controlled as a function of a measured temperature in the generator. Temperatures at specific points in the generator are preferably calculated from the measured temperature. The use of the generator temperature to control the field current allows the generator to be operated in a state where it is overexcited at times, or in high ambient temperature.

A generator, in particular for supplying power in a motor vehicle, is known from German Published, Non-Prosecuted Patent Application DE 41 41 837 A1, in which a field current through a field winding of the generator is likewise controlled as a function of a temperature, to be precise on or in a voltage regulator. The invention in this case envisages that, when a critical temperature value is exceeded, any further temperature rise owing to an excessively high field current is prevented. To this end, the field current is reduced in a suitable manner.

Busick et al. (U.S. Pat. No. 5,373,205) discloses a mathematical model for determining the temperature of an electronic switching component, for example a transistor, for engine or motor control. The temperature model is based on an exponential time function. The temperature is calculated periodically, using the model, with the calculated temperature values being compared with a maximum permissible temperature value. The calculated temperature value is in this case a function of both the instantaneous current through the component and the current in the previous period.

SUMMARY OF THE INVENTION

It is accordingly an object of the invention to provide a method for limiting an electric current through an electrical component, and a limiting apparatus that overcomes the hereinafore-mentioned disadvantages of the heretofore-known methods and devices of this general type and that limits an electric current through an electrical component, in which overheating of the electrical component is reliably avoided but in which, at the same time, a sufficiently high electric current can be passed through the electrical component.

With the foregoing and other objects in view, there is provided, in accordance with the invention, a method for limiting an electric current through an electrical component. The first step of the method is determining a time temperature profile for an electrical component. The next step is calculating a thermal load for the electrical component from the time temperature profile. The next step is limiting an electric current through the electrical component by maintaining the thermal load below a predetermined load maximum value.

With the objects of the invention in view, there is also provided a limiting apparatus for limiting an electric current through an electrical component. The electrical component receives a current and has a temperature. The integration unit integrates a time profile of the component temperature to determine a thermal load of the electrical component. The thermal load measures a material stress on the electrical component resulting from sustained high temperatures. A limiting unit connected to the integration unit limiting the current as a function of the thermal load outputted by the integration unit.

In accordance with another feature of the invention, a limiting apparatus for an electric current through an electrical component is to be provided that achieves a high exhaustion level of the magnitude of the electric current, with high operational reliability at the same time.

In accordance with another feature of the invention, a method provides for limiting an electric current through an electrical component in which a time temperature profile is determined for the electrical component and a thermal load for the electrical component is obtained from this, with the electric current being limited such that the thermal load remains below a load maximum value which can be predetermined.

The thermal load on the electrical component is a measure of the material stress in the component arising from high temperatures being present over a period of time. Because the electric current is limited on the basis of the thermal load, this on the one hand indicates that the electrical component is not thermally loaded beyond a permissible extent. On the other hand, the electric current is fully exhausted in terms of its magnitude and duration, since, using the thermal load, the magnitude and direction of the electric current can be set to be sufficiently high and for sufficiently long that there is just no longer any danger to the electrical component. In other words, the electric current can assume a maximum value and/or can be applied for a maximum maintenance period while reliably avoiding damage caused by thermal overloading. Control just on the basis of the temperature of the electrical component does not guarantee that the electric current is completely exhausted because the thermal load on the electrical component resulting from short-term high temperatures needs to be assessed differently to the load from temperatures which are raised over a lengthy time period.

A temperature limit for the electrical component is preferably defined on the basis that the electrical component is damaged after a certain time above the temperature limit, with the thermal load being calculated by summation or integration of the proportion of the time temperature profile in which the temperature is above the temperature limit.

The temperature limit is that temperature above which thermal damage will occur to the electrical component after a time that is significant in the scale of the average life. In other words, the definition of the temperature limit provides a parameter above which a significant thermal load occurs on the electrical component. The thermal load is obtained by summation and/or by integration of the temperatures in that time interval or in those time intervals in which the temperature is above the temperature limit.

The thermal load is preferably calculated using a thermal time constant of the electrical component, which thermal time constant indicates a characteristic warming-up or cooling-down time for the electrical component. The thermal time constant is used to take account of the thermal inertia of the electrical component in the calculation of the thermal load. If, for example, the electric current is switched off at a temperature above the temperature limit, then this results in the temperature of the electrical component decaying—generally exponentially. Despite the electric current being switched off, the temperature of the electrical component will thus still be above the temperature limit for a certain period of time. This results in a thermal load on the electrical component, which is used for controlling the limiting of an electric current that is connected once again.

The thermal load is preferably obtained from the following formula:

$$b(t_0) = \frac{1}{A}\int_0^{t_0} T(t) - T_G \, dt,$$

where
$b(t_0)$: is the thermal load over the time $t_0$,
$T(t)$: is the temperature of the electrical component as a function of time,
$T_G$: is the temperature limit, and
A: is an integration time constant.

The integration constant A reflects the thermal inertia of the electrical component. It is preferably calculated using the ollowing formula:

$$A = Z\left[(T_S - T_G)\ln\frac{T_S - T_G}{T_S - T_u}\right]$$

where
Z: is the thermal time constant of the electrical component,
$T_S$: is the electrical component temperature which occurs with a steady-state current, and
$T_u$: is the instantaneous temperature of the electrical component at which the electric current is switched off.

The time temperature profile is preferably measured or calculated. The time temperature profile for the temperature of the electrical component may be measured continuously or else in a discrete sequence using a suitable measurement apparatus. The time temperature profile measured in this way is then used to determine the thermal load. However, the time temperature profile also can be calculated. For this purpose, the temperature of the electrical component is preferably calculated as a function of the electric current, with the time temperature profile being calculated from this temperature relationship using the time profile of the electric current. The temperature of the electrical component can be calculated as a function of the electric current by taking account of the electrical resistance of the electrical component. The thermal resistance of the electrical component is preferably also taken into account. Furthermore, the temperature calculation preferably includes non-electrical losses, for example friction losses, and/or a coolant temperature of a cooling fluid that cools the electrical component.

The component temperature is preferably calculated as a function of the electric current using the following formula:

$$T = \frac{1}{T_1 - T_R R_0(20°\text{ C.})\times I^2}[T_1(T_K + T_R) - R_T R_0(20°\text{ C.})I^2(T_2 + (1-x)(T_K + T_R))]$$

where:
T: is the component temperature;
$R_T$: is the thermal resistance;
$R_0$ (20° C.): is the electrical resistance at 20° C.;
X: is a weighting factor for the mean component temperature;
I: is the electric current through the component;
$T_K$: is the coolant temperature;
$T_R$: is the temperature increase due to non-electrical losses; and
$T_1$, $T_2$: are constants, preferably $T_1$=255° C., $T_2$=235° C.

Calculation of the temperature of the electrical component saves the instrumentation complexity for measuring the temperature of the electrical component. For example, this complexity is considerable for a rotor winding of a generator since the measured value of the temperature must be found out from the rotor while it is rotating.

The electric current through the rotor winding and/or stator winding of a generator, in particular a turbogenerator having a rating of more than 10 MVA, and preferably more than 100 MVA, is preferably limited. Owing to the very high volt-ampere densities in a turbogenerator, very high temperatures can occur in its electrical windings that, in some circumstances, cause considerable damage to the winding. The particularly stringent requirements for operational reliability of a generator necessitate a particularly reliable method for limiting the electric current through an electrical winding of the generator, and necessitate particularly accurate indications of the temperature of this electrical winding. This is ensured in a particularly reliable and nevertheless simple manner by limiting the electric current by determining the thermal load on the electrical winding.

The electric current is preferably a field current through the rotor. The field current is increased suddenly to an additional required value in a way that is referred to as "field forcing". Short-term demand peaks can occur on the volt-amperes emitted from a generator. Such a demand peak results in the power supply system voltage being dragged down. This is particularly true in the case of a generator connected to a power supply system. Increasing the field current through the rotor compensates for the voltage drag down. This increase increases the magnetic excitation field from the rotor. As a result, a higher voltage is induced in the stator. This short-term sudden increase in the field current is referred to as field forcing. The field current is increased to a specific additional demand value in a short time. This increased current generally leads to the electrical winding being heated above its temperature limit, and thus to a thermal load on the electrical winding. In the past, the increase in the field current has normally been limited to a specific time window, that is to say a predetermined time period. Once this time window had elapsed, the field current had to be limited to its rated value. This results in two problems.

Firstly, the time window may be too short. That is, depending on the thermal load on the electrical winding prior to the field forcing, the increased field current also could be maintained at the additional demand value for a longer time. This would make it possible to satisfy the increased power supply system demand better.

Secondly, if power supply system voltage fluctuations occur shortly after one another, this can lead to successive field forcings. In this case, the field current would be once again raised to the additional demand value by a second field forcing, immediately following the first field forcing, directly after it has been limited to the rated value. Thus, despite the time window provided, a number of successive field forcings can lead to an unacceptably high thermal load on the electrical winding.

These disadvantages are avoided by limiting the field current by using the thermal load on the electrical winding as a control factor. Determination of the thermal load makes it possible to identify whether the field current can still be maintained at the additional demand value for a longer time, or whether field forcing limiting must be carried out. The field current is in this case preferably maintained at the additional demand value for a maintenance period, with the maintenance period being determined on the basis of the thermal load. A first field forcing is preferably carried out, with a second field forcing following the first field forcing being allowed only if the temperature of the rotor winding is below the temperature limit. A minimum time period is preferably provided between two successive field forcings, and is complied with in all cases.

A cooling fluid temperature of a cooling fluid for the component is preferably measured, and the component temperature of the electrical component is calculated by means of the electric current and the cooling fluid temperature, with the electric current being limited such that the component temperature does not exceed a maximum value which can be predetermined.

The cooling fluid temperature is used to obtain information about the thermal load on the electrical component. The component temperature can now be calculated reliably on the basis of the electric current and the cooling fluid temperature. Such a calculation saves the hardware complexity for measuring a component temperature. This hardware complexity is considerable, especially for rotating electrical windings of an electrical rotating machine.

In the case of an electrical component that is an electrical winding of an electrical rotating machine and, in particular, is a rotor winding of a turbogenerator, the component temperature is preferably calculated while accounting for the thermal resistance of the component, the electrical resistance of the component, and the non-electrical losses. In a hydrogen-cooled turbogenerator, the hydrogen pressure is preferably taken into account in the calculation.

According to the invention, the object relating to a limiting apparatus is achieved by a limiting apparatus for an electric current through an electrical component. The electrical component has an integration unit for integration or summation of a time profile of a component temperature. In addition, the electrical component has a limiting unit, which is connected to the integration unit, for limiting the current as a function of an output signal from the integration unit.

The advantages of such a limiting apparatus lead, on the basis of the above statements, to the advantages of a method for limiting electric current.

The limiting apparatus is preferably used to limit the field current in a rotor or a turbogenerator.

Other features that are considered as characteristic for the invention are set forth in the appended claims.

Although the invention is illustrated and described herein as embodied in a method for limiting an electric current through an electrical component, and a limiting apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
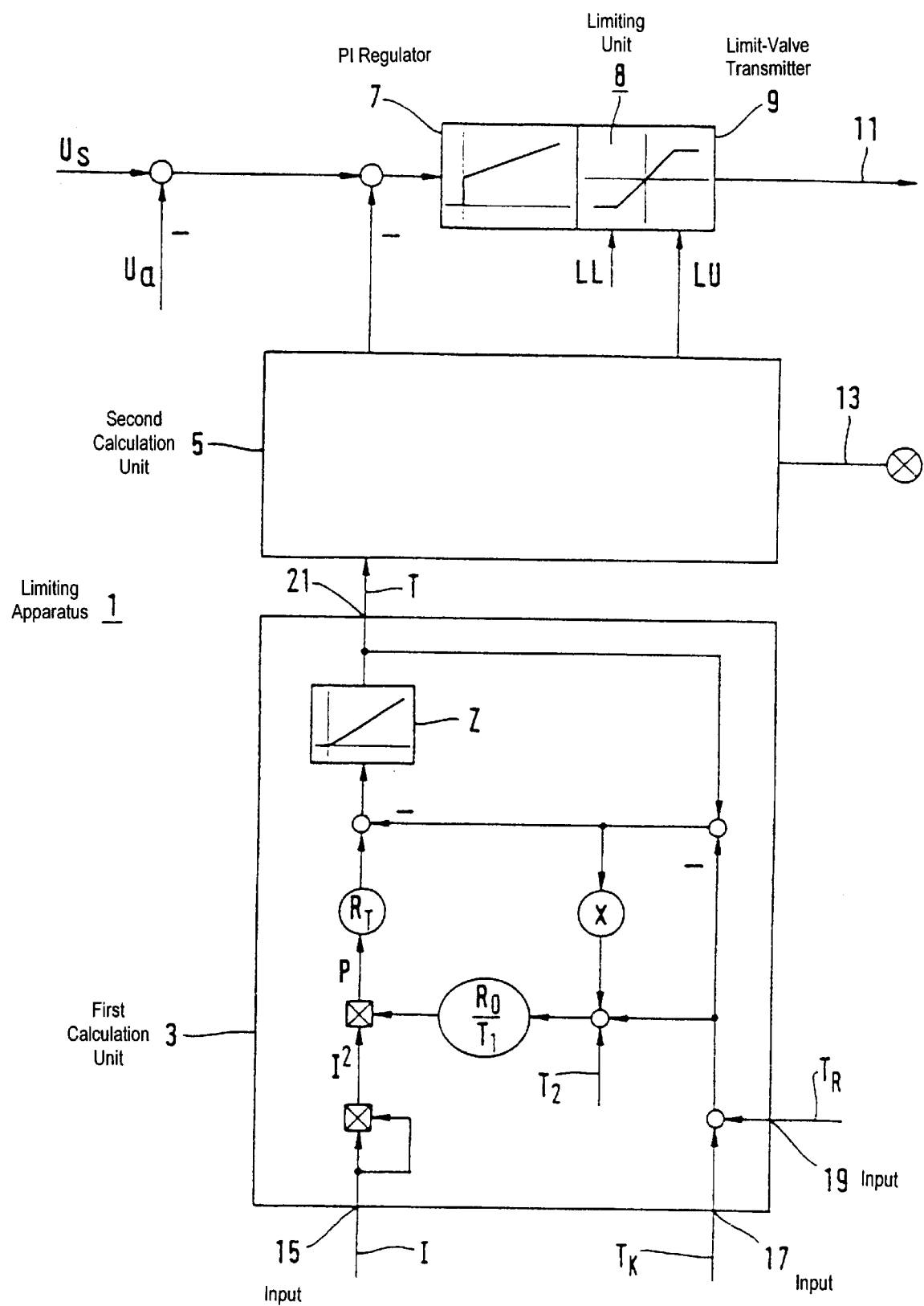
FIG. 1 shows a schematic illustration of a method for limiting an electric current through an electrical winding.

In all the figures of the drawing, sub-features and integral parts that correspond to one another bear the same reference symbol in each case.

Figure 2:
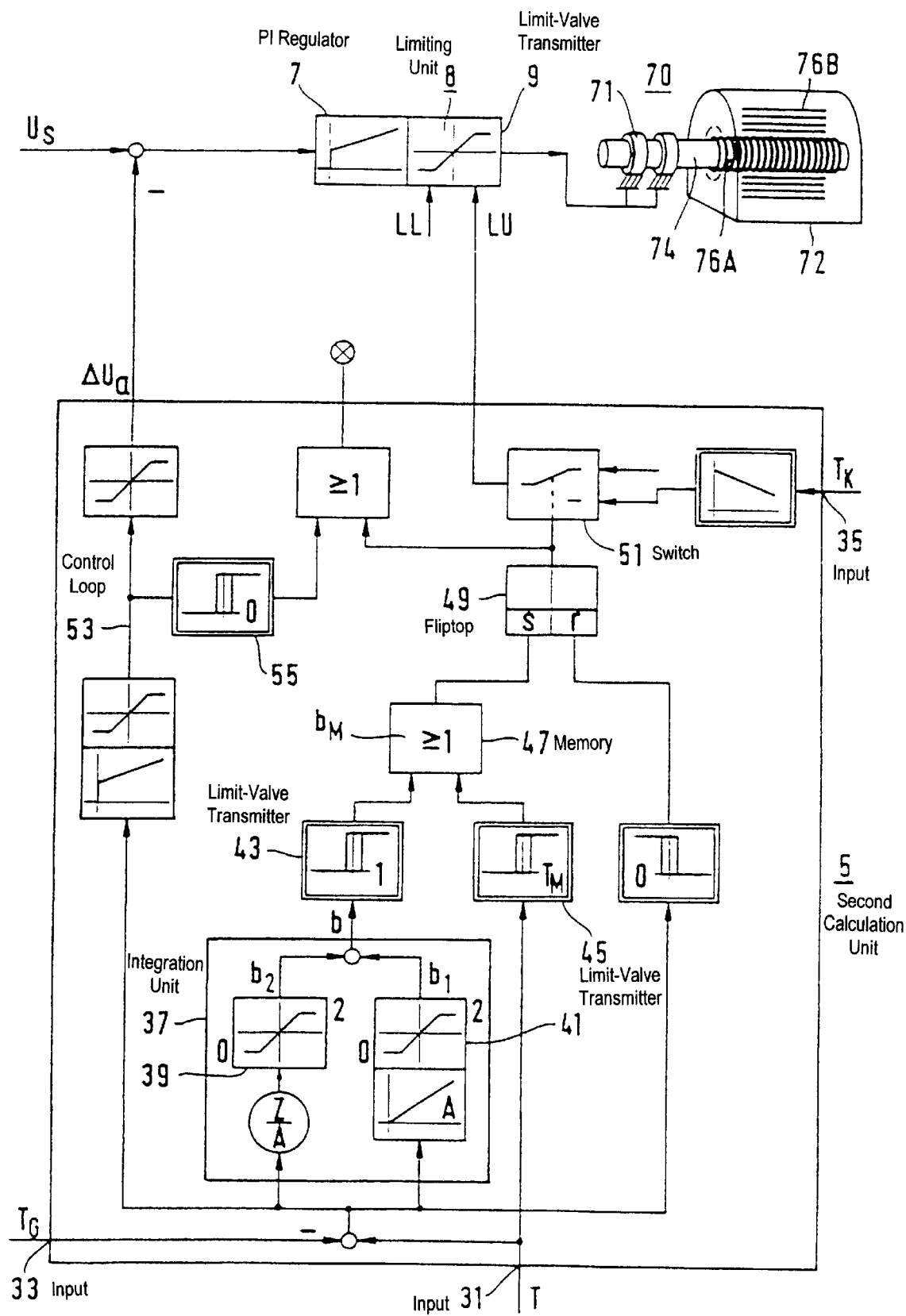
FIG. 2 shows a detailed, schematic illustration of a method step from FIG. 1.

Referring now to the figures of the drawings in detail and first, particularly to FIG. 1 thereof, there is shown a limiting apparatus, generally marked by the reference number 1 or an electric current I through an electrical component 76, n this case an electrical winding 76 (see FIG. 2). The imiting apparatus 1 performs a method for limiting the electric current I through the electrical winding 76. To this end, the temperature T of the electrical winding 76 is calculated in a first calculation unit 3. A limit value for the electric current I through the electrical winding 76 is determined from the temperature calculated in this way, in a second calculation unit 5. The electric current I is then limited by a limiting unit 8, comprising a PI regulator 7 and a limit-value transmitter 9.

In order to calculate the temperature T of the electrical winding 76, the first calculation unit 3 is supplied with the present value of the electric current I, via an input 15. In the case of a cooled electrical winding 76—as is the case in this example—the value $T_K$ of the coolant temperature is supplied via an input 17. Furthermore, a value TR is supplied via an input 19 to the first calculation unit 3, which value ($T_R$) corresponds to a temperature rise caused by non-electrical losses. These values are used to calculate the electrical resistance of the electrical winding as a function of the temperature T. This is preferably done using the following formula:

$$R_0(T) = \frac{R_0(20^\circ \text{ C.})}{T_1} [T_2 + T_K + T_R + x(T - (T_K + T_R))]$$

where:
  $R_0(T)$: is the electrical resistance of the electrical winding as a function of the temperature;
  $R_0(20^\circ \text{ C.})$: is the electrical resistance of the electrical winding at 20° C.;
  $T_K$: is the temperature of the coolant;
  $T_R$: is the temperature rise caused in the electrical winding by non-electrical losses, for example friction;

$T_i$, $T_2$: are constants, preferably $T_1=255°$ C. and $T_1=235°$ C.

X: is a weighting factor for the mean winding temperature;

The power P is determined from the electrical resistance $R_0$ and the electric current I from the following formula:

$$P=R_0 \cdot I^2.$$

Using the thermal resistance $R_T$ of the electrical winding and he thermal time constant Z of the electrical winding, the ate of change of the temperature T of the electrical winding with time t becomes:

$$\frac{dT}{dt} = \frac{1}{Z}[R_T P - (T(t) - (T_K + T_R))]$$

The temperature T of the electrical winding is then obtained using the following formula:

$$T = \frac{1}{T_1 - R_T R_0(20° \text{ C.}) \times I^2}[T_1(T_K + T_R) - R_T R_0(20° \text{ C.})I^2(T_2 + (1-x)(T_K + T_R))]$$

where:

T: is the winding temperature;

$R_T$: is the thermal resistance;

$R_0$ (20° C.): is the electrical resistance at 20° C.;

X: is a weighting factor for the mean winding temperature;

I: is the electric current through the winding;

$T_K$: is the coolant temperature;

$T_R$: is the temperature increase due to non-electrical losses;

$T_1$, $T_1$: are constants, preferably $T_1=255°$ C., $T_2=235°$ C.

The value calculated in this way for the temperature T of the electrical winding is passed to the second calculation unit 5, which determines a limit for the electric current I. This will be explained in more detail with reference to FIG. 2.

FIG. 2 shows, schematically, the second calculation unit 5 for limiting the electric current I from FIG. 1. The second calculation unit 5 is supplied at an input 31 with the value of the temperature T of the electrical winding. A value for a temperature limit $T_G$ is supplied at an input 33. This temperature limit $T_G$ is the temperature above which thermal damage to the electrical winding must be expected. The value of the coolant temperature $T_K$ is supplied at an input 35 to the second calculation unit 5.

If the temperature T of the electrical winding is above the temperature limit $T_G$, then the time temperature profile (T(t)) is integrated in an integration unit 37. This integration leads to the thermal load b on the electrical winding. It is preferably calculated using the following formula:

$$b(t_0) = \frac{1}{A} \int_0^{t_0} T(t) - T_G \, dt$$

where $b(t_0)$: is the thermal load with respect to the time $t_0$;

T(t): is the temperature of the electrical winding as a function of time;

$T_G$: is the temperature limit; and

A: is an integration constant.

The integration is preferably split into two parts, that is to say the thermal load b is the sum of a first part $b_1$ from a warming-up phase of the electrical winding and a second part $b_2$ from a cooling-down phase of the electrical winding. A temperature drop is integrated in the second part $b_2$. The temperature drop is preferably approximated as an exponential decay. The integration constant A is preferably defined in accordance with the following formula:

$$A = Z\left[(T_S - T_G)\ln\frac{T_S - T_G}{T_S - T_u}\right]$$

where

Z: is the thermal time constant of the electrical winding, $T_S$: is the temperature of the electrical winding which occurs with a constant current greater than the rated value, and $T_u$: is the instantaneous temperature of the electrical winding at which the electric current is reduced.

The integration of the time temperature profile T(t) above the temperature limit $T_G$ results in a reliable value for the thermal load b on the electrical winding 76. This value of the thermal load b can now be used to reliably control an electric current I through the electrical winding 76 such that it is matched to the operational situation. A limit value transmitter 43 is used to determine whether the thermal load b is greater than a predetermined limit value $b_m$ in a memory 47. In addition, a limit value transmitter 45 is used to check whether the temperature T of the electrical winding 76 is above a maximum temperature $T_M$. If one of these two conditions is satisfied, then the flipflop 49 and the switch 51 are used to select limiting for the electric current I.

The example here is used to describe the control of the electric current I through a rotor winding 76A of a rotor 74 in a turbogenerator, generally marked with reference number 70. The electric current I results in a magnetic field being built up across the rotor winding 76A which, when the rotor 74 rotates, causes a voltage in a stator winding 76B of a stator 72. A nominal value Us is predetermined for this voltage. The control loop 53 outputs a value $\Delta U_A$. The control loop 53 is used to regulate the terminal voltage $\Delta_A$, by regulating the value $\Delta U_A$, over lengthy time periods such that the temperature T of the winding does not become excessively high.

If, for example, the voltage $U_A$ drops as a result of a short circuit in the power supply system, then the electric current I through the rotor winding 76A must be increased for a short time, and suddenly. This process is referred to as field forcing, and will be explained in more detail with reference to FIGS. 3 and 4.

Figure 4:
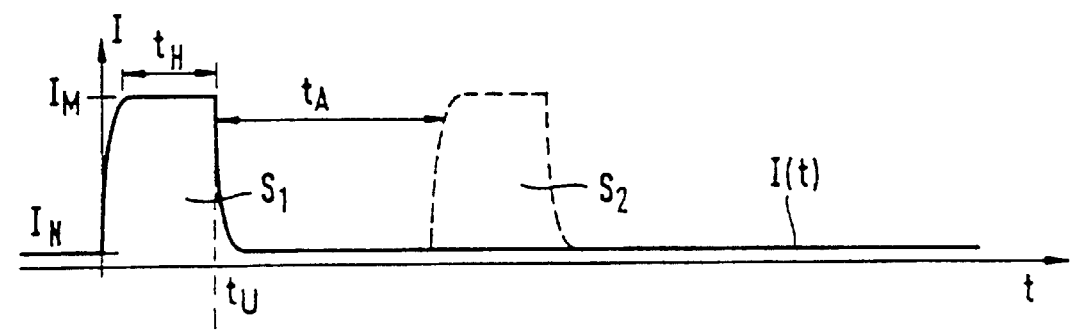
FIG. 4 is a graph plotting an electric current I through a rotor winding during field forcing versus time on the same time scale as FIG. 3.
Figure 3:
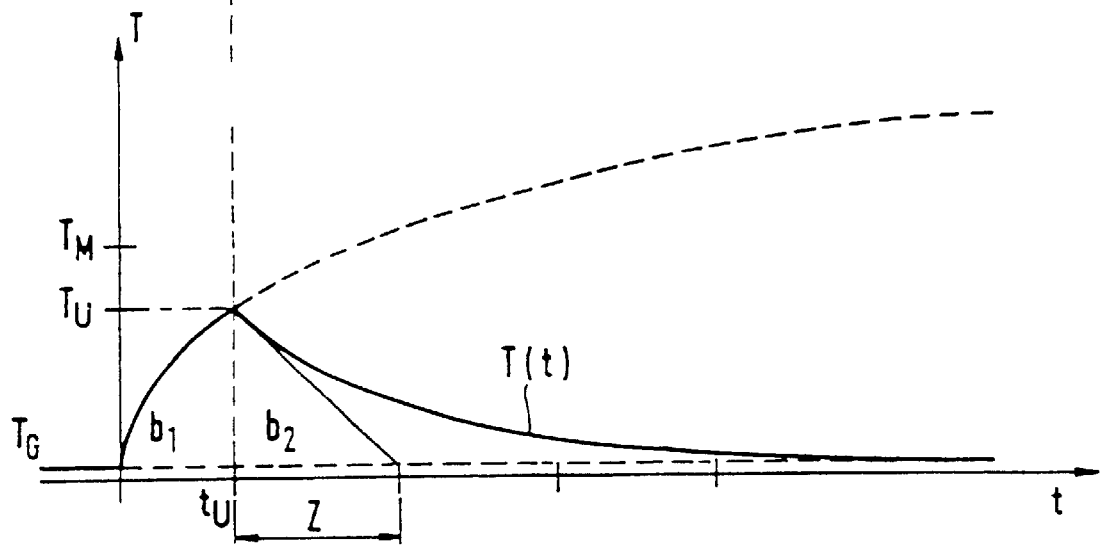
FIG. 3 is a graph plotting a temperature profile versus time.

FIG. 4 shows the time profile (I(t)) of an electric current I through a rotor winding 76A during field forcing. FIG. 3 shows the temperature profile (T(t)) for the temperature T of the rotor winding 76A on the same time scale. The electric current I is raised suddenly from its rated value $I_N$ to an additional demand value $I_M$ during first field forcing $S_1$. It is maintained at this additional demand value $I_M$ for a maintenance period $t_H$. It is then reduced back to the rated value $I_N$ once again. Second field forcing $S_2$ at a time interval $t_A$ is represented by a dashed line.

The electric current I must not be maintained at the additional demand value $I_M$ for more than a certain time since, otherwise, the electrical winding 76 would be heated to an unacceptable extent. For this reason, a maximum time window, for example of ten seconds, has in the past been specified for the maintenance period $t_H$. If the electrical winding 76 was relatively cool before the increase in the electric current I, then this permanently preset time window may be too short, that is to say the current I could without any problems also flow for an even longer time, so that the increased power supply system demand could be satisfied better.

After previous regulation, furthermore, the current I could, in the past, be raised to the additional demand value $I_M$ once again immediately after the predetermined time window had elapsed, that is to say immediately after the current I had been regulated back to the rated value $I_N$. In the event of a number of field forcings $S_1$, $S_2$ following one another at short intervals, the electrical winding 76 may thus be heated to an unacceptably high level, since the maintenance periods $t_H$ for the additional demand value $I_M$ are, in practice, additive.

These problems are solved by the invention. The regulation of the electric current I is based on the actual thermal load b on the electrical winding 76 rather than on a rigid time window. The thermal load b is obtained by integration of the time temperature profile (T(t)) for temperatures that are above the temperature limit $T_G$. During the period $t_H$ in which the electric current I is maintained at the additional demand value $I_M$, the temperature T of the electrical winding 76 rises. Once the current I has been returned to the rated value IN, the temperature T decays exponentially. It is now possible to use the thermal load b to determine precisely how long the current I can be kept at its additional demand value $I_M$ without this leading to excessive heating of the electrical winding 76. Furthermore, this provides a definition for two successive field forcings $S_1$, $S_2$ of when the second field forcing $S_2$ may, at the earliest, follow the first field forcing $S_1$. This is preferably done only when the temperature T of the electrical winding is below the temperature limit $T_G$. Field forcing $S_2$ is thus inhibited, since the field forcing $S_2$ is demanded after a time period $t_A$, within which time period $t_A$ the temperature T is still above the temperature limit $T_G$. Such inhibiting means that the abovementioned summation of the maintenance periods $t_H$, and thus excessive heating of the electrical winding 76, cannot occur.

We claim:

1. A method for limiting an electric current through an electrical component, which comprises:
   determining a time temperature profile for an electrical component;
   calculating a thermal load for the electrical component from the time temperature profile; and
   limiting an electric current through the electrical component by maintaining the thermal load below a predetermined load maximum value.

2. The method according to claim 1, which further comprises:
   defining a temperature limit for the electrical component above which the electrical component is thermally damaged; and
   calculating the thermal load by integrating a proportion of the time temperature profile for which the temperature exceeds the temperature limit.

3. The method according to claim 2, which further comprises:
   providing a thermal time constant of the electrical component; and
   calculating the thermal load from the thermal time constant.

4. The method according to claim 3, wherein the thermal time constant indicates a characteristic warming-up time for the electrical component.

5. The method according to claim 3, wherein the thermal time constant indicates a characteristic cooling-down time for the electrical component.

6. The method as claimed in claim 3, in which the thermal load is obtained from the following formula:

$$b(t_0) = \frac{1}{A} \int_0^{t_0} T(t) - T_G \, dt$$

where
$b(t_0)$: is the thermal load over the time $t_0$,
T(t): is the temperature of the electrical component as a function of time,
$T_G$: is the temperature limit, and
A: is an integration time constant.

7. The method according to claim 6, which further comprises:
   calculating a warming-up element with the formula;
   calculating a cooling-down element with the formula while approximating the temperature profile with an exponential decay; and
   calculating the thermal load by adding the warming-up element and the cooling-down element.

8. The method according to claim 1, which further comprises measuring the time temperature profile.

9. The method according to claim 1, which further comprises calculating the time temperature profile.

10. The method according to claim 9, wherein the temperature of the electrical component is calculated as a function of the electric current, and the method further comprises calculating the time temperature profile from the time profile of the electric current.

11. The method according to claim 1, wherein the electrical component is selected from the group consisting of a rotor, a stator winding, a slipring, an excitation device for a generator, a turbogenerator, a turbogenerator having a rating of more than 10 MVA, and a turbogenerator having a rating of more than 100 MVA.

12. The method according to claim 1, wherein the electrical component includes a rotor winding and the electric current is a field current through the rotor winding, and the method further comprises:
    field forcing the field current in response to an additional demand value;
    determining a maintenance period based on the thermal load; and
    maintaining the field current at the additional demand value for the maintenance period.

13. The method according to claim 12, which further comprises second field forcing after the first field forcing occurs, only when the temperature of the rotor winding is below the temperature limit.

14. The method according to claim 1, which further comprises:
    measuring a cooling fluid temperature of a cooling fluid for the electrical component; and
    preventing the cooling fluid temperature and a component temperature of the electrical component with the electric current from exceeding a predetermined maximum value.

15. The method according to claim 14, which further comprises:
    accounting for a thermal resistance and non-electric loses of the electrical component while calculating the component temperature.

16. In a limiting apparatus for limiting an electric current through an electrical component receiving a current and having a temperature, the improvement comprising:
    an integration unit integrating a time profile of the component temperature to determine a thermal load of the electrical component, the thermal load measuring a material stress on the electrical component resulting from sustained high temperatures; and a limiting unit connected to said integration unit limiting the current as a function of the thermal load output by said integration unit.

17. The limiting apparatus according to claim 16, wherein the electrical component is a component of a turbogenerator.

18. The limiting apparatus according to claim 17, wherein said turbogenerator has a rating of more than 10 MVA.

19. The limiting apparatus according to claim 18, wherein said turbogenerator has a rating of more than 100 MVA.

* * * * *